United States Patent [19]

Soo-Hoo

[11] 4,288,005
[45] Sep. 8, 1981

[54] PRESSURIZED GAS BOTTLE DISCHARGE DEVICE

[75] Inventor: Edward Soo-Hoo, Stanhope, N.J.

[73] Assignee: Cartridge Actuated Devices, Inc., Fairfield, N.J.

[21] Appl. No.: 61,535

[22] Filed: Jul. 27, 1979

[51] Int. Cl.³ .............................................. B67B 7/24
[52] U.S. Cl. ........................................ 222/5; 9/316; 9/320; 137/68 R; 141/392; 280/737
[58] Field of Search ............................. 222/80, 81-91, 222/83.5, 5; 141/19, 329, 330, 4, 392, 10, 67, 114; 137/39, 68 R, 69, 68 A; 9/316, 319, 320; 280/737

[56] References Cited

U.S. PATENT DOCUMENTS 2,947,315  8/1960  Connell ................................. 222/80
3,982,774  9/1976  Ivashuk et al. ...................... 222/80

*Primary Examiner*—Houston S. Bell, Jr.
*Attorney, Agent, or Firm*—Nolte & Nolte

[57] ABSTRACT

A gas bottle, such as that using carbon dioxide gas to inflate a flotation device, is opened by cutting off the neck with an explosively driven ram in a tubular body provided with a transverse aperture receiving the neck of the bottle.

5 Claims, 4 Drawing Figures

PRESSURIZED GAS BOTTLE DISCHARGE DEVICE

FIELD OF THE INVENTION

This invention relates to the field of opening pressurized gas bottles for rapid discharge of the contents.

PRIOR ART

Previously known gas bottle discharge devices use some variety of puncture device for breaking a relatively thin seal at the end of the neck of the bottle. It is known to use an explosively driven punch when a sudden release is desired. Although generally effective, punch devices tend to open a hole of somewhat unpredictable size, so the rate of discharge cannot be accurately predetermined. Also in some environments, operation may be unreliable owing to ice formation.

SUMMARY OF THE INVENTION

According to this invention, the foregoing problems are avoided by cutting off the entire end of the neck of the bottle and providing a defined gas release path that can be designed to allow discharge at a desired rate.

A tubular body contains a slidable ram which can be moved abruptly from a first position to a second position, as by firing a pyrotechnic cartridge. An aperture adapted to receive the neck of a bottle is provided in the wall of the tubular body and a transverse bore is provided in the ram, adapted to receive the end of the bottle neck when the ram is in its initial position. The ram is provided with a circumferential groove that lies under the body aperture when the ram is in its second position. The body is provided with at least one further aperture that exposes the groove when the ram is in its second position.

With the ram in its first position and the bottle in place, the cartridge is fired when the gas is to be discharged. The ram moves to its second position, shearing the neck of the bottle and carrying the end with it in the transverse bore. The gas emerges from the bottle into the groove, thence through the further body opening or openings, at a rate determined by the dimensions of the groove and the openings.

DRAWINGS

Figure 1:
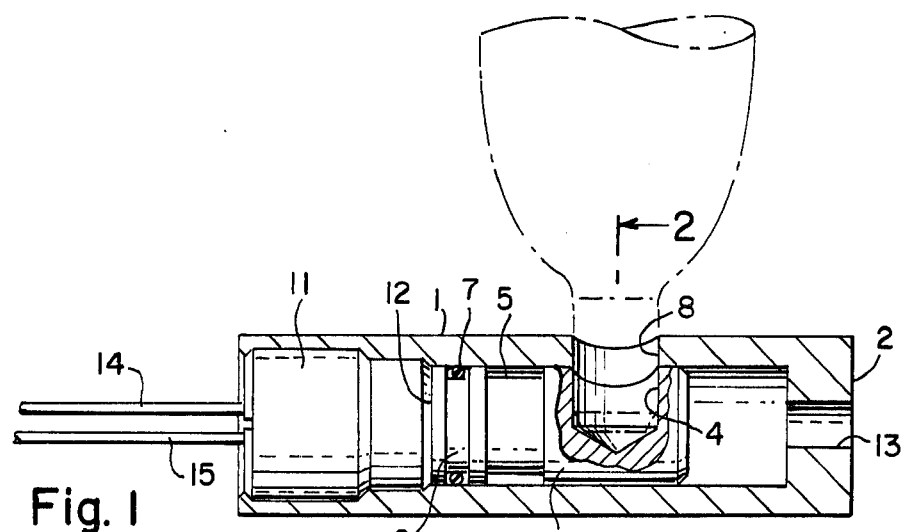
FIG. 1 is an elevational view, partly in section, of a presently preferred invention showing the positional relationship of the parts before discharge.
Figure 2:
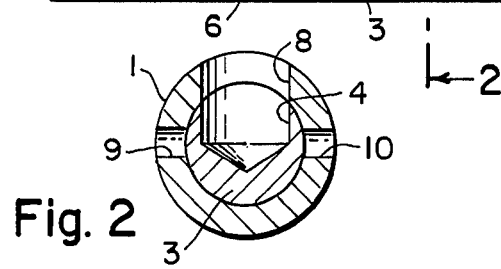
FIG. 2 is a cross sectional taken in the plane 2—2 of FIG. 1.

Referring to FIGS. 1 and 2, a tubular body 1 which an end wall 2 contains a generally cylindrical ram 3 with a transverse bore 4 near its right hand end as viewed in FIG. 1. Near and to the left of the bore, the ram is provided with a circumferential groove 5 of approximately the same width as the bore 4. Further to the left, the ram is grooved at 6 to accommodate an O-ring seal 7.

An aperture is provided at 8 in the upper wall of the body 1, appearing as an extension of the bore 4 when the parts are in initial position as shown in FIG. 1. Either this aperture or the bore, or both, may be internally threaded to receive the threaded neck of a standard gas bottle, indicated in phantom. Alternatively, the bottle may be held in the illustrated relationship to the body by other suitable means such as a clamp device, not shown and not part of this invention. Two further apertures 9 and 10 are provided in the sides of the tubular body, as shown in FIG. 2.

Returning to FIG. 1, a pyrotechnic cartridge 11 of known type is secured as by threading into the left hand end of the body 1. The end of the cartridge abuts the adjacent end of the ram 3 at the surface represented by line 12. To this end, the position of the ram may be adjusted after assembly by means of a pin or other tool inserted through a hole 13 in end wall 2. Insulated conductors 14 and 15 lead to firing means inside the cartridge 11.

In the use of the described device as in inflating a flotation device such as a raft, the body 1 and its contents are disposed inside the enclosure to be filled. The gas bottle may be also inside, or its neck may be inserted from the outside through a suitable opening. Conductors 14 and 15 are connected through a wall of the enclosure to an electrical source such as an immersion actuated battery.

Figure 3:
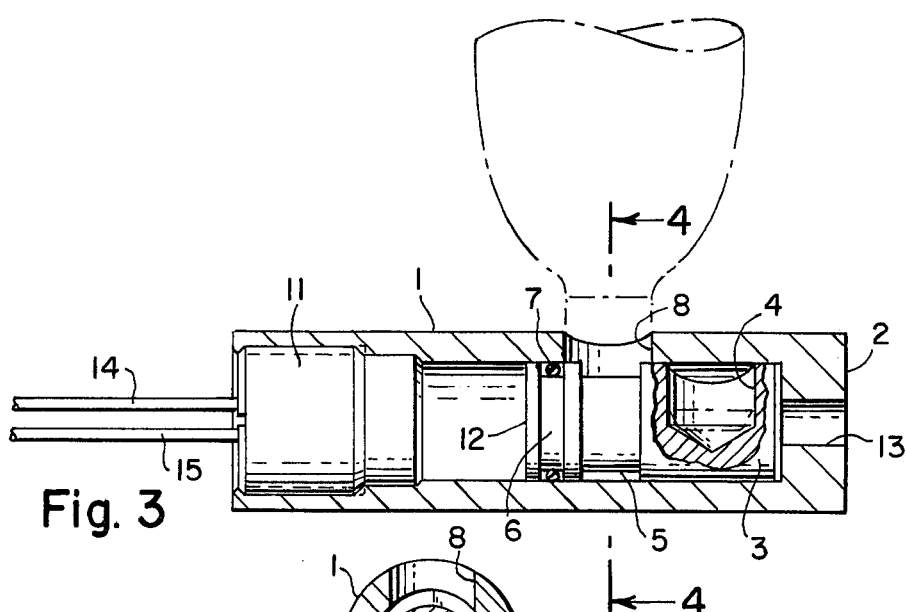
FIG. 3 is a view similar to FIG. 1 but showing the positional relationship of the parts after discharge is initiated.
Figure 4:
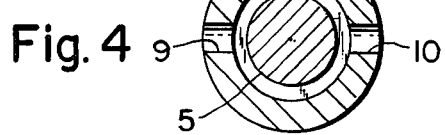
FIG. 4 is a cross section taken in the plane 4—4 of FIG. 3.

Upon electrical energization, the cartridge 11 fires, driving the ram 3 to its right hand position as shown in FIG. 3. The right hand end of the ram is upset to some extend by its impact against wall 3, wedging it in place so there is no rebound. The end of the neck of the bottle is sheared off and remains in bore 4. The groove 5 lies under the open end of the bottle, providing a defined path for the flow of gas to orifices 9 and 10 and thence to the enclosure to be filled. Combustion products from the cartridge are confined within the body by the seal ring 7.

What is claimed is:

1. Apparatus for discharging a gas bottle, comprising:
   (a) a tubular body provided with a transversely facing orifice adapted to receive the neck of a gas bottle,
   (b) a ram member slidably disposed inside said body and provided with a transverse bore adapted to receive the end of the neck of the gas bottle, said ram member being initially positioned with said bore aligned with said orifice, and
   (c) a pyrotechnic device secured within one end of the body member, and adapted, when fired, to drive said ram lengthwise to a second position, shearing off the neck of the bottle and carrying the end; in said transverse bore,
   (d) said ram member being provided with a circumferential groove which, when said ram is in said second position, lies under said transversely facing orifice in said body,
   (e) said body being provided with at least one further orifice that opens into said groove when said ram is in said second position.

2. Apparatus for discharging a gas bottle, comprising:
   (a) a body provided with a longitudinal bore and a transversely facing orifice into said bore adapted to receive the neck of a gas bottle, and
   (b) a ram member slidably disposed in said longitudinal bore and provided with a transverse bore adapted to receive the end of the neck of the gas bottle, said ram member being initially positioned with said transverse bore aligned with said orifice,
   (c) one end of said longitudinal bore being adapted to receive a pyrotechnic device for driving, when fired, said ram to a second position, shearing off the neck of the bottle and carrying the end thereof in said transverse bore, (d) said ram member being provided with a peripheral groove which, when said ram is in said second position, lies under said transversely facing orifice in said body, (e) said body being provided with at least one further orifice that opens into said groove when said ram is in said second position.

3. The apparatus of claim 2, wherein said ram member is provided with a second groove adjacent the side of the first groove opposite the transverse bore. and a sealing ring disposed in said second groove.

4. The apparatus of claim 2, wherein said body is provided with a wall at the end of said longitudinal bore opposite the end adapted to receive a pyrotechnic device, said wall constituting means to stop the motion of said ram at said second position.

5. The apparatus of claim 4, wherein said wall is provided with an orifice adaped for admission of a tool for adjusting said ram to its initial position.

* * * * *